United States Patent [19]

Eastman

[11] 4,422,764
[45] Dec. 27, 1983

[54] INTERFEROMETER APPARATUS FOR MICROTOPOGRAPHY

[75] Inventor: Jay M. Eastman, Pittsford, N.Y.

[73] Assignee: The University of Rochester, Rochester, N.Y.

[21] Appl. No.: 215,785

[22] Filed: Dec. 12, 1980

[51] Int. Cl.³ .............................................. G01B 11/02
[52] U.S. Cl. .................................... 356/357; 356/359
[58] Field of Search ............... 356/349, 351, 357, 358, 356/359, 360

[56] References Cited

U.S. PATENT DOCUMENTS

| 1,879,263 | 9/1932 | Huffschmidt | 350/108 X |
| 3,796,495 | 3/1974 | Laub | 356/349 |
| 3,809,481 | 5/1974 | Schindler | 356/346 |

FOREIGN PATENT DOCUMENTS 52-45890  4/1977  Japan ................................... 350/6.3

OTHER PUBLICATIONS

Keller et al., "Michelson Interferometer for Detection of Fast Displacements...", *Applied Optics*, vol. 14, No. 7, pp. 1616-1620 7/75.

Zakharov et al., "A Homodyne Interferometer with Indication of Reversal", *Instruments and Experimental Tech.*, vol. 18, No. 4, pp. 1220-1223 8/75.

Hartman et al., "Development of Nomarski Microscopy...", *Proc SPIE*, vol. 192, pp. 223-230, 1979.

*Primary Examiner*—William L. Sikes
*Assistant Examiner*—Matthew W. Koren
*Attorney, Agent, or Firm*—Martin LuKacher

[57] ABSTRACT

Interferometer apparatus for measuring the microtopography of surfaces in two dimensions (surface roughness) uses monochromatic light from a laser. A beam splitter divides the light and directs a beam to the surface being measured and another beam to a reflector. The phase of the reflected beam is varied linearly by means which applies a saw tooth wave to an electromechanical transducer on which the reflector is mounted. The beam is focused onto a spot on the surface by a lens which is translated along the surface in two dimensions. The beams from the reflector and the surface are recombined by the beam splitter and the interference fringe detected thus producing an alternating current signal. The waveform is tracked during the rising portion of the waveform and sampled and held during the retrace portion of the saw tooth. Finally, the resulting waveform is filtered to provide an alternating current (AC) output, the phase change of which is a measure of the topography of the surface to a high degree of accuracy, for example, less than one Angstrom (Å) vertical resolution and one micron (um) horizontal resolution. The apparatus provides a low cost profile measurement device which is highly accurate.

18 Claims, 4 Drawing Figures

INTERFEROMETER APPARATUS FOR MICROTOPOGRAPHY

DESCRIPTION

The present invention relates to interferometry, and particularly to an interferometer apparatus for measuring the microtopography of the surface of an object.

The invention is especially suitable for providing a profile measurement device for measuring the surface roughness, the microtopography or the surface texture of optical surfaces, mechanical components, laser fusion targets, magnetic storage media, substrates for thin film and microcircuits, integrated circuits and other objects where surface conditions are important.

Techniques for measuring surface roughness have been the subject of extensive study and various techniques have been proposed such as involve the use of a stylus, measurement of light scattering effects and multiple beam interferometers. A survey of such techniques is found in Bennett, Applied Optics, Vol. 15, No. 11, 2705 (November 1976). Multiple beam or heterodyne interferometers or profile measurement devices have been proposed which are capable of making measurements to high degrees of accuracy in terms of the vertical and horizontal resolution of the instrument. Such instruments are complicated and accuracy of their measurements is adversely affected by the means used to scan the surface under test. In many multiple beam interferometers, such as the scanning interferometer described in the above referenced article by Bennett, the entire surface is illuminated by the light from the source, and the interference pattern in an image plane conjugate to the surface is probed in order to derive outputs from the interference fringes. The total illumination from the source is distributed over the entire image plane which reduces the signal-to-noise ratio of the output derived from probing the image plane such that either the accuracy of the measurement is adversely affected or the measurement must be made over an extended time period. Where a focused spot has been used, a rotation of the object that has been required. The rotation mechanism can introduce errors unless it is of extremely high precision and carefully aligned with the interferometer (see Sommagren, Heterodyne Profilometer for Measuring Surface Microstructure, which appeared in abstract form in the 1979 Annual Meeting Program of the Optical Society of America. The abstract was also published in the journal of the Optical Society of America, November 1979).

The Sommagren profile measurement device uses orthogonally polarized beams in order to obtain accurate surface roughness measurements by interferometry. Orthogonally polarized beams have also been used in nonscanning profilometers (see Tackaberry, U.S. Pat. No. 3,620,593 issued Nov. 16, 1971). The polarized light must be carefully polarized and analyzed in order to provide measurements in such apparatus. A drawback of interferometers which use polarized light resides in the need for accurate polarizing and analyzing of the light, and in the need for a Zeeman-split laser to produce beams of slightly differing frequencies.

In other heterodyne interferometers it is necessary to shift the phase of the light propogating in one arm of the interferometer. The phase change must be linear with time without introducing perturbations in the phase variation which would render the microtopography measurements inaccurate. Complex optical modulation techniques using Zeeman-split lasers to produce beams of different frequencies for use in the interferometer, Pockels cells and acousto-optical modulators may be used, however they require complex control circuits and are costly to implement.

It is a feature of this invention to provide apparatus capable of measuring the microtopography of a surface to a high degree of accuracy which can be implemented at lower cost than other devices capable of the same order of accuracy, such that an instrument embodying the invention may be used extensively, for example on production lines in the fabrication of integrated circuits, mechanical components and optical devices, where quality depends on surface roughness.

A feature of the invention which enables the implementation of a accurate interferometer for surface roughness measurements resides in achieving the scanning of the surface by translating the means for focusing the beam on the surface in a plane parallel to the surface. This focusing means may be a lens. Translating the lens translates its focal spot on the surface. It has been found, in accordance with the invention, that the translation of the lens introduces substantially no change in the optical path of the beam if the surface remains within the depth of focus of the lens. For example, if the surface has an irregular profile h(x), where x is the distance along the surface that the focal spot is translated, then scanning will introduce a phase change g(x) in the beam given by:

$$g(x) = \frac{4\pi h(x)}{\lambda}. \tag{1}$$

In equation (1), $\lambda$ is the wavelength of the light used in the interferometer. A two dimensional scan of the surface is obtained by translating the lens in two dimensions. Inasmuch as it is only necessary to translate the lens in a plane which does vary vertically more than to a tolerance of approximately equal to the depth of the focus of the lens, the scanning mechanism need not be extremely precise.

An ancillary feature of the invention is obtained by providing a modulator of the phase of the beam in one arm of the interferometer, for example the reference beam, by linearly changing the optical path length traversed by the beam. A reflector, such as a mirror, is reciprocated by an electromechanical transducer, such as a piezoelectric element, actuated in response to a saw tooth wave having a linear ramp and a retrace portion. The phase of a signal corresponding to the interference pattern formed when the reference beam and beam reflected from the surface are recombined, may be perturbed by the retrace portion of the saw tooth wave. By tracking the AC output signal from the detector and holding it constant during the retrace portion of the saw tooth, the AC output, when filtered, varies linearly in phase with respect to time. The change in the phase of the signal is then due to the surface microtopography. The phase of the AC signal may be measured to provide an indication of the surface microtopography.

It is therefore the object of the present invention to provide an improved interferometer apparatus having one or more of the features which are described above.

It is a further object of the present invention to provide a surface profile measurement device having one or more of the features described above.

Briefly described, the interferometer apparatus for measuring the microtopography of the surface of an object which embodies the invention makes use of light reflector means and means for dividing a first beam of incident monochromatic light into second and third beams directed toward the surface and toward the reflector means. The dividing means also is operative to recombine the second and third beams upon reflection therefrom to interfere with each other. The dividing means may be a beam splitter. Means between the dividing means and the surface focuses the second beam into a spot on the surface and scans the spot along the surface while redirecting the second beam to the dividing means. The phase difference between the recombined second and third beams provides a measurement of the microtopography of the surface and is obtained by a detector which provides an AC output, the phase of which represents the phase change due to the microtopography of the surface.

The foregoing and other objects, features and advantages of the invention, as well as presently preferred embodiments thereof, will become more apparent from a reading of the following description in connection with the accompanying drawings in which.

Figure 1:
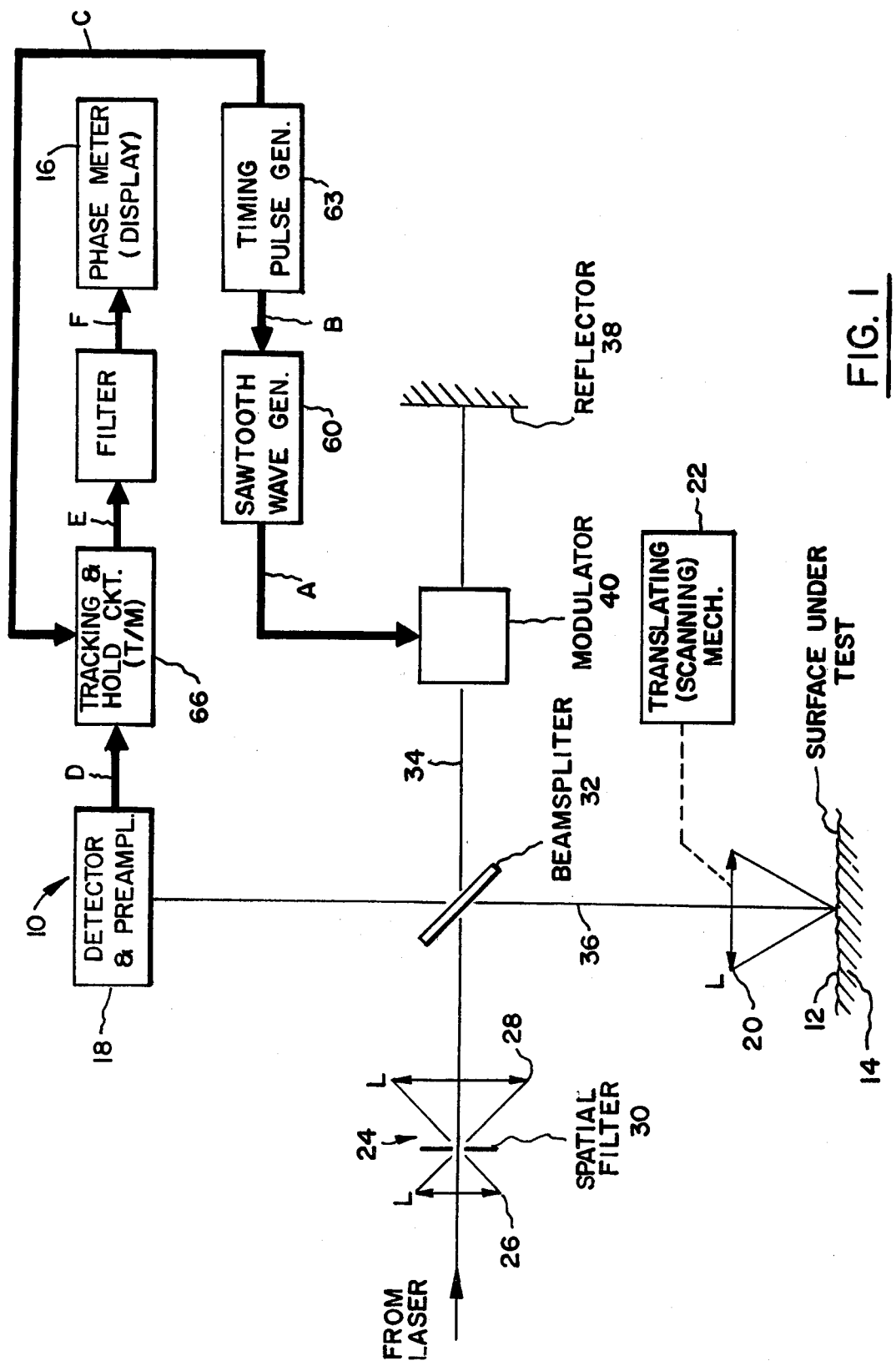
FIG. 1 is a schematic diagram showing an interferometer apparatus for measuring the microtopography of a surface in accordance with an embodiment of the invention.

Referring more particularly to FIG. 1, there is shown an interferometer apparatus 10 for measuring the microtopography (surface roughness) of the surface 12 of an object 14. The object may, for example, be a microcircuit, a substrate, on which microcircuits are deposited or formed, a laser fusion target, a mechanical component, or any other object, thing or device where surface topography is a parameter which requires measurements. The topography is the change or deviation in this surface profile in the vertical direction (viz., the height of the hills above the valleys along the surface). The measurement provided by the interferometer is a phase measurement. The phase change is indicated by the phase of an AC output signal on a phase meter circuit or display 16. Such circuits are capable, conservatively, of phase measurements to 0.1° or one part in 3600. Monochromatic light from a laser, such as a helium neon laser, is used in the interferometer apparatus 10. A 360° phase change in the AC signal, resulting from the interference pattern, detected by a photocell or other photodetector 18 corresponds to a one-half wavelength path length change due to changes in the height of the surface 12. One-half wavelength of a helium neon laser wavelength is 3164 Angstroms (Å). The precision of the interferometer in measuring variations in the profile of the surface 12 is 3164 Angstroms/3600 or approximately 0.88 Angstrom. The vertical resolution is, therefore, less than one Angstrom.

The horizontal resolution depends upon the diffraction limited focal spot diameter of a lens 20 which is translated over the surface by a translating mechanism 22. The lens 20, like the other lens in the apparatus 10, is illustrated by the convention where the outwardly pointing arrows indicate a converging or convex lens. The diffraction limited spot size of a lens is the product of 2.44, the wavelength of the light, and the f/number (aperture) of the lens. The lens 20 may, for example, be provided by a microscope objective having a magnification of sixty times (60x) and an fl number of approximately f/0.6. Thus, for a helium neon wavelength of 6328 Angstroms, the focal spot size is less than one micron (um). The horizontal resolution is then approximately one micron (um). Accordingly, the interferometer apparatus 10 can have a horizontal resolution along the surface of approximately one micron. The AC signal representing the phase change may be digitized and processed in a computer. Alternatively, analog processing circuits may be used. The computer or analog processing circuits may provide the roughness as an rms value or in the form of other statistical functions.

In the interferometer 10, the laser beam is expanded and spatially filtered by a spatial filter 24 having two lenses, 26 and 28, which focus the beam at a pinhole aperture in an aperture plate 30. A beam splitter 32 divides the beam into a first beam 34, which serves as a reference in one arm of the interferometer 10, and a second beam 36 which is focused on the surface 12 by the lens 20. At least half of the available illumination from the laser is focused into a single spot rather than being spread over the entire surface 12.

The beam reflected from the surface 12 of the object 14 is directed by the lens 20 back to the beam splitter where it is recombined with the reference beam 34 reflected from a reflector 38. The reference beam passes through a modulator 40 where the reference beam 34 is modulated in phase. The phase modulation is desirably linear with time, as will be explained more fully below. The reflector 38 and modulator 40 may be combined into a unitary structure shown in FIG. 2 wherein the phase modulation is obtained by linearly, with time, varying the optical path length in the arm of the interferometer containing the reference beam 34.

The reference beam 34 and beam 36 from the object recombine at the beam splitter 32 and interfere or heterodyne to produce an interference pattern at the detector 18. The interference pattern is temporally modulated in phase due to the phase modulator 40 in the path of the reference beam 34. The AC output from the detector may be preamplified; this AC output is proportional to the intensity of the combined beams 34 and 36.

The intensity of the combined beam at the detector, $I_t$, is governed by the equation for two beam interference:

$$I_t = I_1 + I_2 + 2\sqrt{I_1 I_2} \cos d \qquad (2)$$

$I_1$ is the intensity of the beam 36 from the object at the detector 18 and $I_2$ is the intensity of the reference beam 34 at the detector 18. The phase difference between the two beams is d. d can be written in the form:

$$d = b + \phi(t) \qquad (3)$$

$\phi$ represents the phase modulation introduced by the modulator 40 and b represents the phase difference between the object and reference beam 36 and 34 due to the geometric path difference in the interferometer.

When $\phi(t)$ increases linearly in time, it is governed by an equation of the form:

$$\phi(t) = wt. \quad (4)$$

The time varying intensity incident on the detector 18 is then:

$$I_t(t) = I_1 + I_2 + 2\sqrt{I_1 I_2} \cos(b + wt) \quad (5)$$

Inasmuch as b is a result of the profile of the surface 12, it may be determined by measuring the phase of $I_t(t)$. The phase of the AC signal from the detector and pre-amplifier 18 is, therefore, a measure of the surface profile, and the change in phase represents the surface profile.

The translating mechanism 22 may include a linkage witch is coupled to a holder for the lens 20, or the microscope objective, when it provides the lens 20, and which translates the lens 20 in two dimensions or directions perpendicular to each other along the surface 12. The mechanism maintains the lens so that it does not move vertically outside of the depth of focus of the lens. Scanning is therefore accomplished in a simple and effective manner without perturbing the phase in the interferometer or the accuracy of the measurement. By using a lens with a large diameter and a depth of focus, a relatively large area, for example, several hundred microns of the surface 12 may be scanned.

Figure 2:
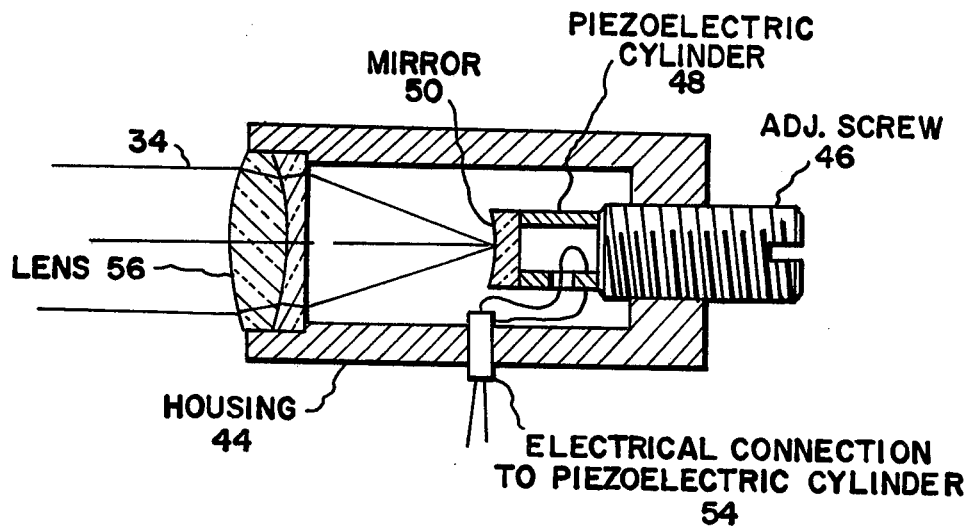
FIG. 2 is a sectional view of the modulator and reflector for the reference beam which is shown in FIG. 1.

As may be observed from the above equation, the modulator 40 should produce a phase change that varies linearly in time. Various modulators, such as acousto-optical modulators or Pockel cells, may serve the purpose. It is preferred to use a modulator which linearly varies the path length of the reflected reference beam 34 (viz., the length of the reference arm in the interferometer apparatus 10). A preferred form of the modulator is shown in FIG. 2. A housing 44 which is cylindrical and cup shaped has an adjustment screw 46 threaded into the closed end thereof. An electromechanical transducer, in the form of a piezoelectric (PZT) cylinder 48 is attached to the adjustment screw. The screw may be made of insulating material or an insulating layer disposed at the end of the screw on which the piezoelectric cylinder 48 is mounted. A mirror 50, having a concave surface, is attached to the free end of the cylinder 48. Voltage for driving the transducer and causing the piezoelectric cylinder to change its axial length are applied thereto by way of leads 52 which enter the housing 44 through a grommet 54. A lens 56, which may be a compound lens, focuses the reference beams 34 on the mirror 50. A "cats-eye" retroreflector is thereby provided.

The mirror 50 is reciprocated along the direction of the reference beam 34 so as to change the optimal path length in the reference arm of the interferometer.

In order to obtain a linear variation in phase with respect to time, the change in path length must be linear with respect to time. Due to the limited excursion of the piezoelectric cylinder 48 (its expansion and contraction along the reference beam path), it is not possible to obtain a continually linear variation in phase with respect to time. However, a linear variation in phase during one direction of movement, either the expansion or contraction axially of the piezoelectric cylinder 48, is obtained through the use of the circuitry shown in FIG. 1.

Figure 3:
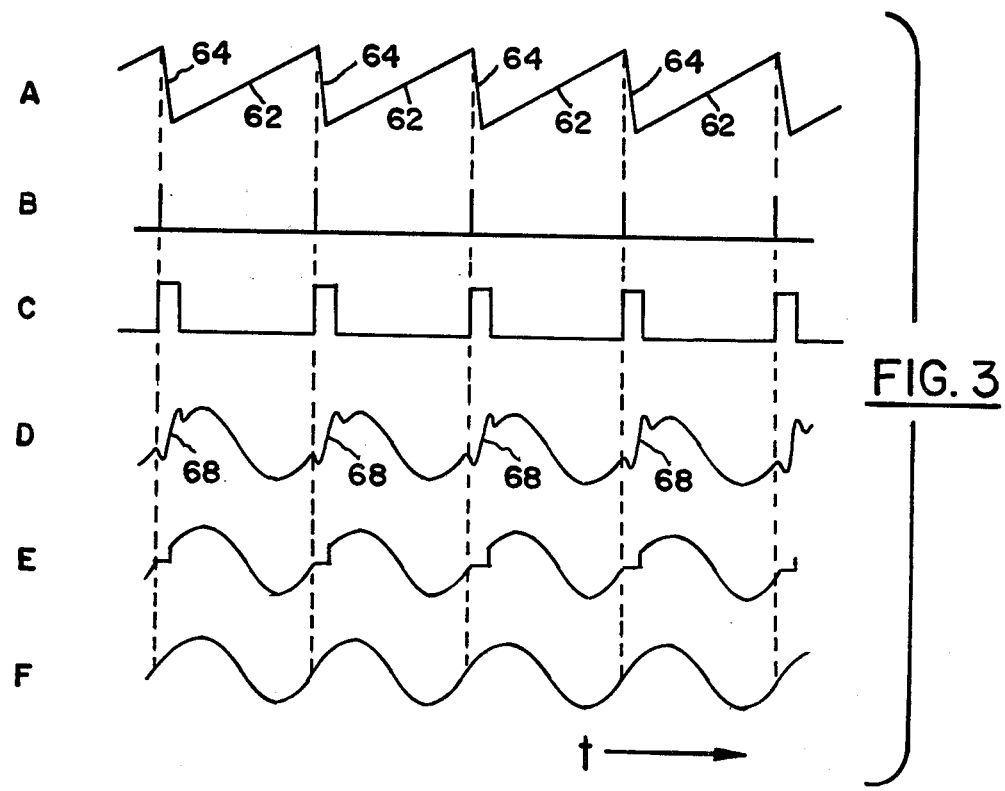
FIG. 3 are wave forms of electrical signals resulting from the operation of the apparatus shown in FIG. 1.

A saw tooth wave generator 60 produces a saw tooth wave form as shown in wave form A in FIG. 3. This wave form is repetitive and has linear ramp 62 and retrace portions 64. A timing pulse generator 63 provides timing pulses to the saw tooth wave generator, which pulses are shown in wave form B of FIG. 3. The saw tooth wave generator may be a relaxation oscillator having a capacitor which is discharged by the pulses (wave form B) and allowed to charge between these pulses to produce a linear ramp. The pulse generator 63 also provides, for example, as through the use of a one-shot multivibrator, triggered by the wave form B pulses, pulses such as shown in wave form C of duration which cover the duration of the retrace portion 64 of the saw tooth wave. These pulses are applied to a tracking and hold circuit (T/H) 66 which may be an integrated circuit. This circuit 66 tracks and transmits the AC output from the detector and preamplifier 18 which is shown in wave form D of FIG. 3, and holds its amplitude constant during the retrace portion 64 of the saw tooth wave. It is during this retrace portion of the saw tooth wave that the optical path length variation in the reference arm of the interferometer apparatus 10 is not linear. A transient 68 then occurs in the AC wave from the detector and preamplifier 18, as shown in wave form D of FIG. 3. The tracking and hold circuit 66 clamps or maintains the amplitude of the detector and preamplifier 18 output constant during this transient, that is during the retrace portion of the saw tooth wave. The output of the tracking and hold circuit 66 is shown in wave form E of FIG. 3. When this output is filtered, as by a low pass or band pass filter network 70, a continuous sinusoidal signal is produced. This suignal is shown in wave form F of FIG. 3. The change of phase in this signal is a measure of the surface roughness or the microtopography of the surface 12. The signal is applied to a phase meter 16 which indicates, processes or displays the phase or the surface roughness corresponding thereto.

Figure 4:
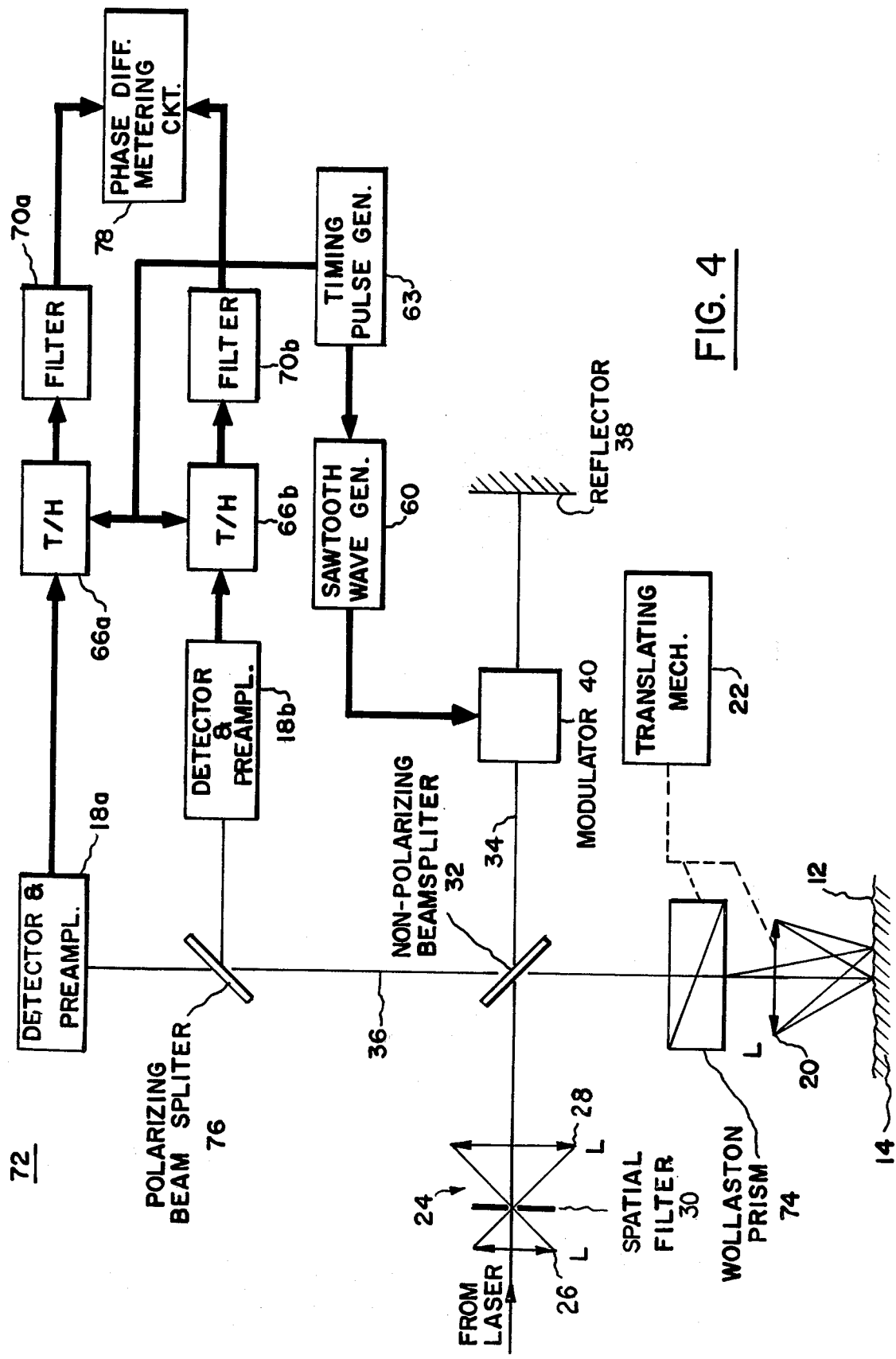
FIG. 4 is a schematic diagram showing an interferometer apparatus for surface microtopography measurement in accordance with another embodiment of the invention.

Referring to FIG. 4, there is shown an interferometer apparatus 72 in accordance with another embodiment of this invention. The advantage of the interferometer apparatus 72 in obtaining surface profile measurement data, is that it provides a measurement of the differential height between adjacent spaced points along the surface 12 of the object 14, the microtopography or profile of which is being measured. As in the interferometer apparatus 10, a beam from a laser, such as a helium neon laser, is expanded and spatially filtered by a spatial filter arrangement 24. In the embodiment of the invention shown in FIG. 4, elements and components similar to those shown in FIG. 1, are identified by like reference numerals.

The input beam is applied through a nonpolarizing beam splitter 32 and divided into reference and object beams 34 and 36. The object beam is split into two components of different polarization, particularly of orthogonal polarization at slightly different angles by a Wollaston prism 74. The lens 20 focuses these components at two points which are spaced from each other along the surface 12. The translating mechanism 22 is coupled to both the prism 74 and the lens 20 and translates them in two directions (orthogonal, x and y directions) along the surface 12 so as to scan the surface. The reference beam is reflected by a reflector 38 and modulated temporally in phase in a linear manner by the modulator 40. This modulator and reflector can desirably combine at an integral modulator unit such as shown in FIG. 2.

A saw tooth generator 60, operated to produce repetitive saw tooth wave by a timing pulse generator 63, obtains the temporal, repetitive phase modulation of the reference beam. The phase modulated reference beam and the object beam, which contain both polarization components, are recombined at the nonpolarizing beam splitter 32. The recombined beams are divided by a polarizing beam splitter 76 into a first combined beam containing the reference beam and one of the polarizations of the object beam and a second beam, also containing the reference beam and the other polarization of the object beam. The polarizing beam splitter 76 directs these separate recombined beams to separate detector and preamplifiers 18a and 18b. The interference patterns at the detectors 18a and 18b are translated into AC signals having the transients 68 during the retrace portion of the saw tooth wave, as was explained in connection with FIG. 3. The tracking and hold circuits (T/H) 66a and 66b and filters 70a and 70b provide the AC signals which linearly vary in phase and are shifted in phase, depending upon the height of the spots on the surface 12 where the different polarization components of the object beam are focused.

Phase difference metering circuits 78 obtain the phase difference between the AC waves applied thereto from the filters 70a and 70b. This phase difference metering circuit may be a phase detector which provides an analog output having an amplitude corresponding to the phase difference. This analog output may be digitized and digitally processed or processed by analog circuit means to provide an indication or display of rms surface roughness or other statistical distribution and measurement of the profile or microtopography of surface 12.

From the foregoing description, it will be apparent that there has been provided improved interferometer apparatus for measuring the surface microtopography of various objects. While two embodiments of the invention have been illustrated variations and modifications, within the scope of the invention, will undoubtedly suggest themselves to those skilled in the art. Accordingly, the foregoing description should be taken as illustrative and not in a limiting sense.

I claim:

1. Interferometer apparatus for measuring the microtopography of the surface of an object which comprises light reflector means, means for dividing a first beam of incident monochromatic light into second and third beams directed towards said surface and said reflector means and for recombining said second and third beams upon reflection therefrom to interfere with each other, means between said dividing means and said surface for focusing said second beam into a spot on said surface, means for moving said focusing means to scan said spot along said surface while said spot is maintained within the depth of focus of said focusing means, means for phase modulating said third beam, and means for detecting the phase difference between said recombined second and third beams to provide a measure of the microtopography of said surface.

2. The invention as set forth in claim 1 wherein said phase modulating means comprises means for varying the distance betwen said reflector means and said dividing means linearly with time.

3. The invention as set forth in claim 2 wherein said linearly varying means includes means for repetitively increasing and decreasing said distance with at least one of said increasing and decreasing of said distance varying linearly with time.

4. The invention as set forth in claim 2 wherein said reflector means comprises a housing, a mirror having a concave reflecting surface facing said dividing means, lens means for focusing said third beam on said mirror reflecting surface, a piezoelectric element disposed in said housing, said mirror being attached to said element on the side thereof opposite to said concave reflecting surface, and said lens means being disposed in said housing adjacent to the concave reflecting surface of said mirror.

5. The invention as set forth in claim 1 wherein said distance varying means includes means for moving said reflector means toward and away from said dividing means which comprises an electromechanical transducer coupled to said reflector means, and means for applying a saw tooth wave electrical signal to said transducer.

6. The invention as set forth in claim 5 wherein said reflector means is a mirror having a reflecting surface on the side thereof facing said dividing means, a piezoelectric element connected to the opposite side of said reflector, and said saw tooth wave signal being applied to said element to change the length thereof in the direction of said third beam.

7. The invention as set forth in claim 5 wherein said saw tooth wave signal has a ramp portion which changes linearly in amplitude with time and a retrace portion, and means in said detecting means for deriving from said recombined beams an electrical signal corresponding to said phase difference, means for tracking and holding the amplitude of said signal from said detecting means during said retrace portion, and means for filtering said signal from said tracking and holding means to provide a sinusoidal output having a phase corresponding to the microtopography of said surface.

8. The invention as set forth in claim 1 wherein said dividing and recombining means is a beam splitter.

9. The invention as set forth in claim 1 wherein said focusing means comprises a lens, and said moving means comprises a mechanism attached to said lens for translating said lens in two orthogonal directions to scan said second beam and said spot along said surface in two dimensions while maintaining said lens in a third direction orthogonal to said two directions within the depth of focus of said lens.

10. Interferometer apparatus for measuring the microtopography of the surface of an object which comprises light reflector means, means for dividing a first beam of incident monochromatic light into second and third beams directed toward said surface and said reflector means and for recombining said second and third beams upon reflection therefrom to interfere with each other, means between said dividing means and said surface for focusing said second beam into a spot on said surface, means for phase modulating said third beam, means for detecting the phase difference between said recombined second and third beams to provide a measurement of the microtopography of said surface, means for providing said second beam as a pair of components each of different polarization angularly displaced from each other such that the second beam polarization components are each focused at different spots in spaced relationship on said surface, said detecting means comprising means for separately detecting each of a pair of phase differences between the pair of polarization components of said recombined second beam and third beam, and means responsive to the difference between said pair of said phase differences to provide a measurement of microtopography of said surface.

11. The invention as set forth in claim 10 wherein said polarization components are orthogonal polarization components, and said means for providing said polarization components and focusing them comprises a Wollaston prism and a lens.

12. The invention as set forth in claim 10 wherein said first beam dividing means is a nonpolarizing beam splitter and said means for separately detecting said phase differences comprises first and second detectors and a polarizing beam splitter for dividing said recombined second and third beam into a fourth beam containing one of said polarization components of said second beam combined with said third beam directed to said first photodetector and a fifth beam containing the other of said polarization components of said second beam combined with said third beam and directed to said second photodetector.

13. The invention as set forth in claim 12 wherein said third beam modulating means comprises an electromechanical transducer on which said reflector means is mounted for reciprocating movement to vary the distance between said nonpolarizing beam splitter dividing means and said reflector means, means for repetitively generating saw tooth waves having linear ramp portions and retrace portions and applying said waves to said transducer means, means for tracking the output signals from said first and second photodetectors and holding said output signal amplitudes constant during said retrace portions, means for filtering the outputs of said tracking means to provide AC outputs the phases of which represent each of said pair of said differences, and phase difference metering means responsive to the difference in phase of said AC outputs to provide said microtopography measurement.

14. For use in an interferometer in which an interference pattern produces an alternating current signal, apparatus for changing optical path length linearly with time which comprises electromechanical transducer means the displacement of which corresponds to the amplitude of an electrical signal applied thereto, means for translating the displacement of said transducer means into a corresponding change in said path length, means for generating a repetitive saw tooth wave signal having linear ramp and retrace portions and applying said saw tooth wave signal to said transducer means, means for tracking said alternating current signal while inhibiting any change in the amplitude thereof during said retrace portions, and means for filtering said alternating current signal from said tracking means to provide an output alternating current signal.

15. The invention as set forth in claim 14 wherein said path length is the path length of a reference beam in said interferometer, and said translating means includes means having a reflecting surface coupled to said transducer and movably disposed in the reference beam path.

16. The invention as set forth in claim 15 wherein said translating means comprises a retroreflector attached to said transducer and movable in opposite directions along said path for equally increasing and decreasing the length thereof, one of said increasing and decreasing of said path length occurring during said ramp portion and the other during said retrace portion.

17. The invention as set forth in claim 14 wherein said transducer is a piezoelectric transducer, and said translating means comprises a mirror attached to said transducer for reciprocating movement along said path.

18. The invention as set forth in claim 17 further comprising means for generating repetitive pulses, means for applying said pulses to said sawtooth wave signal generating means to time the occurrence of the retrace portions of said sawtooth waves and to said tracking means to hold the amplitude of said alternating current signals constant during said retrace portions.

* * * * *